United States Patent [19]
Yonkers et al.

[11] 4,009,917
[45] Mar. 1, 1977

[54] COMPRESSION STRESSED LINER FOR REFRIGERATION EQUIPMENT AND METHOD OF MAKING SAME

[75] Inventors: Edward H. Yonkers; Wilford D. Harris, both of Midland, Mich.

[73] Assignee: The Dow Chemical Company, Midland, Mich.

[22] Filed: Feb. 10, 1975

[21] Appl. No.: 548,501

Related U.S. Application Data

[60] Division of Ser. No. 361,904, May 21, 1973, which is a continuation of Ser. No. 123,133, March 11, 1971, abandoned.

[52] U.S. Cl. .................... 312/214; 29/446; 52/573
[51] Int. Cl.² ............................................ B23P 11/02
[58] Field of Search ............... 312/214; 52/573; 29/446, 448, 449

[56] References Cited

UNITED STATES PATENTS

| | | | |
|---|---|---|---|
| 1,053,267 | 2/1913 | Benson et al. | 52/573 |
| 1,357,713 | 11/1920 | Lane | 52/573 |
| 2,878,534 | 3/1959 | Josaitis | 52/573 |
| 2,948,994 | 8/1960 | Thom | 52/573 |
| 3,057,119 | 10/1962 | Kessler | 29/449 |
| 3,159,249 | 12/1964 | Lazan | 52/573 |
| 3,243,855 | 4/1966 | Houvener et al. | 52/573 |
| 3,350,831 | 11/1967 | Miller | 52/573 |
| 3,401,996 | 9/1968 | Rembold et al. | 312/214 |
| 3,470,662 | 10/1969 | Kellman | 52/573 |
| 3,883,198 | 5/1975 | Tillman | 312/214 |
| 3,884,000 | 5/1975 | Faleij | 52/573 |

FOREIGN PATENTS OR APPLICATIONS

| | | | |
|---|---|---|---|
| 203,927 | 2/1955 | Australia | 24/449 |
| 965,110 | 9/1950 | France | 52/573 |
| 735,068 | 8/1955 | United Kingdom | 152/573 |

*Primary Examiner*—P. R. Gilliam
*Assistant Examiner*—Victor N. Sakran
*Attorney, Agent, or Firm*—Arthur J. Young

[57] ABSTRACT

A compression stressed liner for refrigeration equipment and a method of stressing the same is disclosed. The effective life span of refrigeration equipment liners can be significantly increased by compression stressing. Stressing liners in compression before or during assembly of refrigeration equipment is accomplished by bending the liners, molding the liners to form a shallow arc in one direction of its structure or shrinking the liners and then securely attaching the same. Compression stressed liners counteract localized tensile stresses that normally develop because of shrinking of the liners during use at temperatures substantially below assembly temperatures. Compression stressing of liners also reduces the size of or eliminates foramina on the exposed surfaces of the liners, normally increased in size by the tensile stresses, thus decreasing chemical penetration and attack of liners.

6 Claims, 3 Drawing Figures

COMPRESSION STRESSED LINER FOR REFRIGERATION EQUIPMENT AND METHOD OF MAKING SAME

CROSS REFERENCE TO RELATION APPLICATION

This is a division of application Ser. No. 361,904, filed May 21, 1973, which, in turn, is a continuation of application Ser. No. 123,133 filed Mar. 11, 1971, now abandoned.

BACKGROUND OF THE INVENTION

1. Field of the Invention

This invention relates to liners used in refrigeration equipment, with particular reference to liners stressed in compression and methods of stressing the same prior to or during assembly to counteract tensile stresses and chemical penetration and attack which normally develop in liners during use and which reduces the effective useful life span of said liners.

2. Description of the Prior Art

In general the use of interior liners for decorative and utility purposes in refrigeration equipment is well known. Refrigeration equipment liners are normally made from, but are not limited to, thermoplastic materials and are normally designed to last 5 to 15 years. The conventional method of assembling liners into refrigeration equipment is to securely attach said liners at ambient room temperatures to the outer shell of the refrigeration equipment by screws, gluing, welding or other known means.

Heretofore, the methods used to assemble liners into refrigeration equipment have often resulted in the development of serve tensile stresses which cause premature failure of the liners during use. The liners contact when the temperature of the refrigeration equipment is reduced during operation, thus causing the tensile streses to develop. The tensile stresses are normally located near the means of attaching the liners to the outer shells of the refrigeration equipment. The localized tensile stress areas additionally provides a problem in that the surface foramine of the liners in the tensile stress areas tend to increase in size, thus allowing increased chemical penetration and attack of said liners. When subjected to tensile stresses, and particularly when accomplished by hostile chemical environments, liners may experience severe cracking and premature failure, thus reducing the effective life span of the refrigeration equipment.

SUMMARY

In general, the present invention provides a refrigeration equipment liner having a body which is stressed in compression prior to or during assembly into refrigeration equipment. The compressive stressed liner effectively counteracts tensile stresses which normally develop in a refrigeration equipment linear during use as a result of shrinkage of the liner caused by operating temperatures which are substantially below assembly temperature. The compressive stressed liner also exhibits decreased adverse chemical attack since the compression stressing substantially reduces the size of or eliminates foramina on the exposed surfaces of the liner, thus preventing penetration of chemicals into said liner. The structure of the compression stressed liner prior to assembly can be the same as any conventional liner. The compressive stressed liner can be made from but is not limited to, a thermoplastic material such as high impact polystyrene or polyacrylonitrile butadiene styrene. The liner can be assembled or secured into the refrigeration equipment by conventional means such as screws, welding or gluing.

Compressive stress is herein defined as the compressive load per unit area of cross-section at any given point within the liner body and is expressed in force per unit area. Compressive stress is a well-known generic term used in the art as noted by a ASTM test method, D 695-63T, entitled "Compressive Properties of Rigid Plastics".

Compression stressing of the liner may be accomplished by, but is not limited to, bending the liner perpendicular to its long direction such that the opposing ends of the sides perpendicular to and adjacent the long sides of the liner are attached to the outer shell of the refrigeration equipment at points shorter than their free length. To accomplish this, the liner may be bent in a suitable jig to the proper dimensions during assembly. The degree of arc in the long direction of the liner is dependent on the thermoshrink characteristics of the liner material and the difference between the normal operating temperature of the refrigeration equipment in which the liner is placed and the assembly temperature of the same. The effective compression stress within the liner is achieved when the two remaining free ends of the long sides of the liner are securely attached to the outer shell of the refrigeration equipment. An alternative to bending the liner during assembly would be to mold or form the liner with the proper degree of arc in its long direction. If the compression stressed liner herein described has sides of equal length, such as a square, the most convenient assembly direction may be used to bend the liner.

Another compression stressing method that can be used, but which is less desirable because of restrictive assembly conditions, is to shrink the liner by cooling it down to or below the operating temperature of the refrigeration equipment and then attaching the liner while it is maintained at this temperature.

Accordingly, an object of the present invention is to provide a compressive stressed liner for refrigeration equipment which will reduce or eliminate localized tensile stresses which normally develop in liners during use and which cause premature cracking of said liners.

Another object of the present invention is to provide a compressive stressed liner which is less subject to chemical penetration and attack because the exposed liner surface foramina, normally increased in size by localized tensile stresses during use, are reduced in size or eliminated by the compression stressing of said liners.

A further object of the present invention is to provide methods for compression stressing and assembling liners used in refrigeration equipment to prolong the useful life of said liners and refrigeration equipment.

Other objects of the invention will appear in the following description and claims, reference being had to the accompanying drawings forming a part of this specification.

BRIEF DESCRIPTION OF THE DRAWINGS

Preferred embodiments of the invention are shown in the drawings wherein.

DESCRIPTION OF THE PREFERRED EMBODIMENTS

The following description illustrates the manner in which the principles of the invention are applied but are not to be construed as limiting the scope of the invention.

Figure 1:
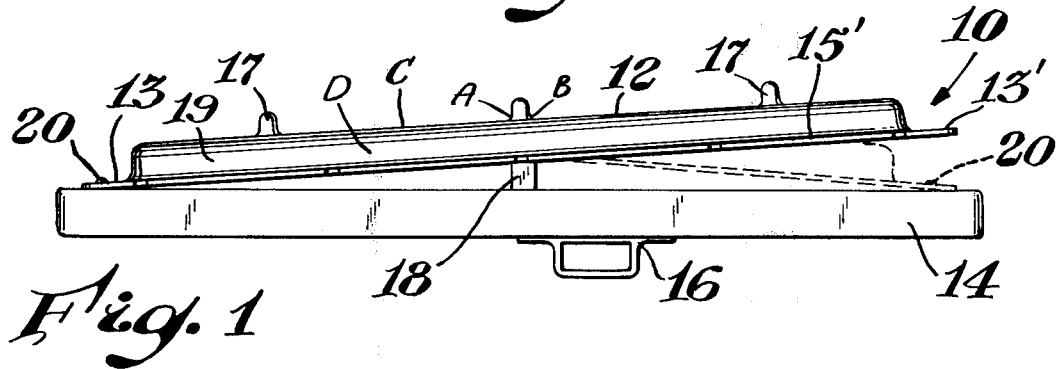
FIG. 1 is a side elevation of the long side of a partially assembled refrigerator door which shows a door liner fastened to one end of outer door shell and alternatively, as shown by the dotted lines, securely attached at both opening ends to form an arc in said door liner.
Figure 2:
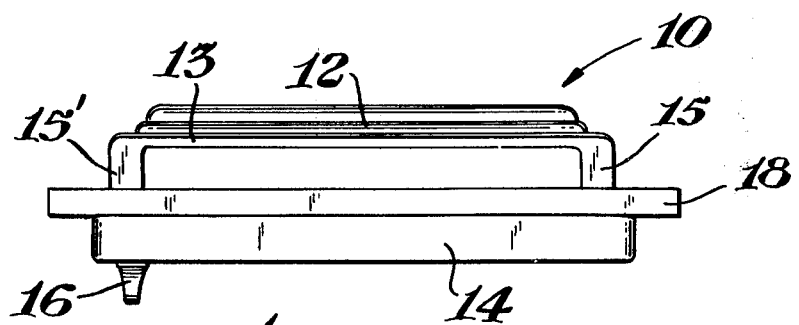
FIG. 2 is a side elevation of a partially assembled refrigerator door viewed from the right side of FIG. 1.

Referring more specifically to FIGS. 1 and 2, a partially assembled refrigerator door 10 which can be about 5 feet in length and three feet in width having a high impact polystyrene thermoplastic interior liner 12, an outer metal sheel 14 containing thermoinsulation and a handle 16 is shown. One short side 13 of the interior liner 12 is securely attached to the outer shell 14 by screws 20. Alternatively, as shown by the dotted lines in FIG. 1, the partially assembled refrigerator door 10 also illustrates the attachment of both opposing short sides 13 and 13' of the interior liner 12 to the outer shell 14 by screws 20.

Figure 3:
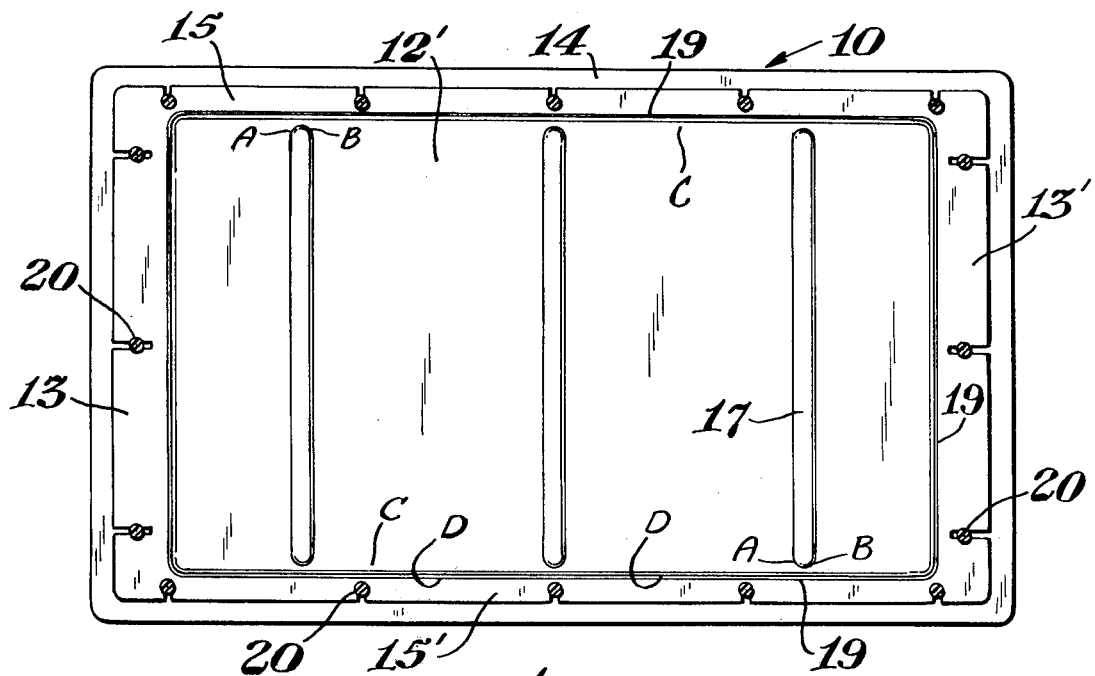
FIG. 3 is a plan view of the inside of a completely assembled refrigerator door showing a compressive stressed liner securely attached to the outer door shell.

The attachment of both opposing short sides 13 and 13' of the interior liner 12 is accomplished by bending the interior liner 12 into an arc over a one inch wooden spacer 18 that has been placed between the liner 12 and the outer door shell 14. The spacer 18 is removed after both opposing short sides 13 and 13' of the liner 12 have been securely attached to the outer shell 14 by screws 20. At this point in the assembly of the refrigerator door 10, there is no significant compression stressing of the interior liner 12. To achieve a compressive stressed interior liner 12', as shown in FIG. 3, it is necessary to securely attach the long sides 15 and 15' of the liner 12 to the outer door shell 14. FIG. 3 illustrates a completely assembled refrigerator door 10 having a compressive stressed interior liner 12' securely attached to the outer shell 14 by screws 20.

To determine the location of major tensile stress during normal operating use within a liner like liner 12, but which has not been compressive stressed as described above, an experimental stress analysis was carried out. The major stress areas are shown at A, B, C and D in FIGS. 1 and 3. Stress areas A and B are located near the ends of and on or adjacent the base of the ribs or shelves 17 of liner 12. Stress area C is located along the long sides 15 and 15' on the inside top curved edge of the side wall 19 of liner 12 and stress area D is located along the long sides 15 and 15' in the center of side wall 19 of liner 12. A refrigerator door 10 was then assembled, as described above, with a compressive stressed interior liner 12' and the amount of compression stressing at the assembly temperature for areas A, B, C and D was determined with strain gauges. The following Table I illustrates the compression stressing of liner 12' for areas A, B, C and D.

TABLE I

| MAJOR STRAIN LOCATION | COMPRESSION STRESS psi |
|---|---|
| A | 847 |
| B | 460 |
| C | 657 |
| D | 13 |

It is to be understood that the scope of this invention is not limited by specific compositions or structures of the interior liners. It is also to be understood that this invention is not limited by whether the liner is stressed prior to or during assembly into the refrigeration equipment. It is further to be understood that the scope of this invention is not limited to compressive stressed liners attached only to the door of refrigerator equipment, but that any liner within the refrigerator equipment can be stressed in compression. Thus, while certain representative embodiments and details have been shown for the purpose of illustrating the invention, it will be apparent to those skilled in the art that various changes and modifications can be made therein without departing from the spirit and scope of the invention.

What is claimed is

1. A method for preventing tensile stress failure in an interior liner of refrigeration equipment comprising:
    a. placing said liner in compressive stress; and
    b. securely attaching said liner while maintaining said compressive stress to an outer shell portion in said refrigeration equipment thereby substantially counter-acting tensile stress in said liner caused by shrinkage of said liner as said equipment cools down to operating temperature.

2. The method of claim 1 wherein placing said liner in compressive stress is accomplished by applying a force to opposing edges of said liner.

3. A method for preventing tensile stress failure in an interior liner of refrigeration equipment comprising:
    a. shaping said liner with an arc in one direction thereof; and
    b. securely attaching said liner on each side to an outer shell portion in said refrigeration equipment thereby causing compressive stress in said liner which generally prevents formation of undesirable tensile stress in said liner resulting from shrinkage of said liner as said equipment cools down to operating temperature, liner sides in said one direction being securely attached before opposing sides are securely attached to said outer shell portion.

4. The method of claim 3 wherein said arc is molded into said liner as said liner is being formed.

5. The method of claim 3 wherein said arc is formed by bending said liner before securely attaching said liner to said outer shell portion.

6. A method for preventing tensile stress failure in an interior liner of refrigeration equipment comprising:
    a. cooling said liner substantially to or below the temperature said refrigeration equipment is subjected to during use; and
    b. securely attaching said cooled liner to an outer shell portion in said refrigeration equipment while the temperature of said liner is maintained substantially at or below the temperature said equipment is subjected to during use.

* * * * *

UNITED STATES PATENT AND TRADEMARK OFFICE
CERTIFICATE OF CORRECTION

PATENT NO. : 4,009,917
DATED : March 1, 1977
INVENTOR(S) : Edward H. Yonkers and Wilford D. Harris It is certified that error appears in the above-identified patent and that said Letters Patent are hereby corrected as shown below:

On page 1, under "FOREIGN PATENTS OR APPLICATIONS", 1st line, the Australian reference Class should read --29/449--.

Column 1, line 5, change the word "RELATION" to --RELATED--

Column 1, line 35, change "serve" to --severe--.

Column 1, line 36, change "contact" to --contract--.

Column 1, line 39, change "streses" to --stresses--.

Column 1, line 42, change "provides" to --provide--.

Column 1, line 43, change "foramine" to --foramina--.

Column 1, line 58, change "linear" to --liner--.

Column 1, line 61, change "temperature" to --temperatures--

UNITED STATES PATENT OFFICE
CERTIFICATE OF CORRECTION

Patent No. 4,009,917          Dated  March 1, 1977

Inventor(s) Edward H. Yonkers et al.

It is certified that error appears in the above-identified patent and that said Letters Patent are hereby corrected as shown below:

Column 2, line 68, before "outer" insert -- an --.

Column 3, line 21 "sheel" should read -- shell --.

Signed and Sealed this

Thirty-first Day of May 1977

[SEAL]

Attest:

RUTH C. MASON
Attesting Officer

C. MARSHALL DANN
Commissioner of Patents and Trademarks